O. P. HIPPLE.
TROLLEY SHOE.
APPLICATION FILED MAR. 14, 1917.
1,370,018.
Patented Mar. 1, 1921.
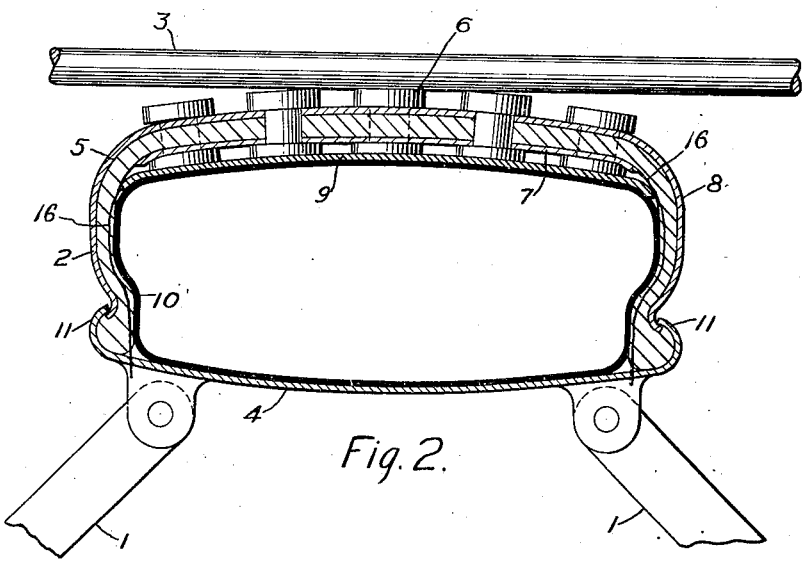
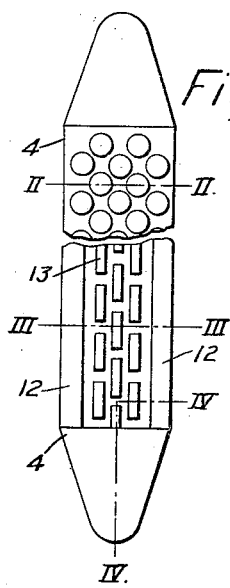
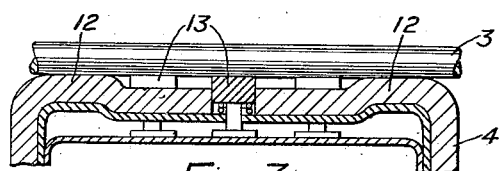
Fig. 3.
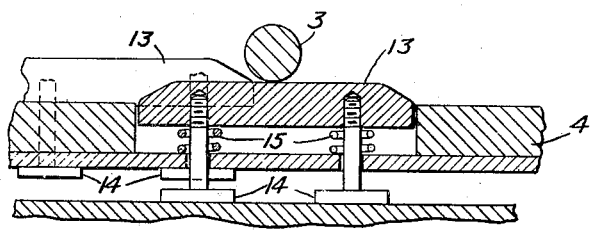
Fig. 4.
WITNESSES:
Ed Plinke.
W.C.McCoy.
INVENTOR
Oliver P. Hipple
BY
Wesley G. Carr
ATTORNEY

UNITED STATES PATENT OFFICE.

OLIVER P. HIPPLE, OF WILKINS TOWNSHIP, ALLEGHENY COUNTY, PENNSYLVANIA, ASSIGNOR TO WESTINGHOUSE ELECTRIC & MANUFACTURING COMPANY, A CORPORATION OF PENNSYLVANIA.

TROLLEY-SHOE.

1,370,018.  Specification of Letters Patent.  Patented Mar. 1, 1921.

Application filed March 14, 1917. Serial No. 154,814.

*To all whom it may concern:*

Be it known that I, OLIVER P. HIPPLE, a citizen of the United States, and a resident of Wilkins township, in the county of Allegheny and State of Pennsylvania, have invented a new and useful Improvement in Trolley-Shoes, of which the following is a specification.

My invention relates to current-collecting devices for electric vehicles, and it has for its object to provide a trolley shoe which shall respond readily to irregularities in the height of the trolley wire.

When an electric vehicle is operating at a relatively high speed, the trolley is unable to accurately follow the variations in the height of the trolley wire by reason of the inertia of the somewhat cumbersome trolley shoe structure which imposes a certain sluggishness of action upon the movements of the shoe. Even with the catenary method of suspension, there are still many places where the wire is higher than at other places and, if the trolley leaves the wire by reason of this non-uniform height of the trolley wire, arcing, trouble and delay result.

In accordance with my invention, I propose to remedy these evils by providing a contact shoe which shall be locally responsive to undulations in the trolley conductor, and which, by reason of the comparatively lightness of the moving parts, will readily adapt itself to abrupt variations in the height of the trolley wire.

Figure 1 of the accompanying drawing is a top plan view of a trolley shoe constructed in accordance with my invention; Fig. 2 is an enlarged sectional view taken on the line II—II of Fig. 1; Fig. 3 is an enlarged sectional view taken on the line III—III of Fig. 1, and Fig. 4 is an enlarged view, partially in section and partially in elevation, taken on the line IV—IV of Fig. 1.

The current-collecting device shown in the drawing comprises portions 1 of a pantograph frame, a trolley shoe 2 that is mounted upon the frame 1, and a trolley wire 3, from which the trolley shoe 2 is adapted to collect current.

The trolley shoe 2 comprises a base 4, to which the arms 1 of the pantograph frame are pivotally connected, a flexible casing 5 that is mounted upon the base 4, and a plurality of contact members 6 that are mounted in the flexible casing 5 and are adapted to engage the coöperating trolley wire 3. The casing 5 has a flexible current-conducting fabric 7 embodied therein to which the contact members 6 are electrically connected. From the fabric 7 the current is conducted to the arms 1, through wires 16 embedded in the casing 5, and thence to the motor, in the usual manner. The main body of the casing 5 is preferably composed of rubber and canvas, in order to provide a readily resilient member, and is covered by an asbestos shield 8 which protects the rubber from arcing and heating caused by poor contact engagement of the contact members 6 with the trolley wire 3. The inner portion of the casing 5 is provided with a shield 9 that is interposed between an inflatable tube 10 and the bases of the contact members 6. The base 4 has lips 11 which engage the edges of the casing 5 and hold the same in operative position.

It will be understood that, with such a device as I have herein described, the surfaces of the contact members 6 will be locally resilient to the pressure from the trolley conductor 3, thus providing a current-collecting structure which will yield substantially, only at the point of contact with the current-collecting shoe, and, since this portion of the shoe is of comparatively light weight and small inertia, it will respond quickly to blows or to abrupt variations in the height of the trolley conductor. Furthermore, with the contact surface for each shoe divided into a plurality of parts, more than one point of the shoe will have good electrical contact with the trolley conductor, since the studs 6 are relatively movable and each is biased to engagement with the trolley conductor by the fluid-inflated tube 10.

It will be understood that although I have illustrated my invention as employing a flexible casing and a pneumatic tube for giving resiliency thereto, obviously, a flexible contact surface may be constructed by employing independently movable contact members that are each provided with individual resilient members. Such a structure is illustrated in Fig. 1, Fig. 3 and Fig. 4 of the drawing. The base 4 is provided with current-collecting side portions 12 that are normally held in engagement with the trolley wire and a plurality of independently movable contact members 13 that are mounted between the side portions 12. The base member 4 has a plurality of pockets in which the contact members 13 are mounted. Each of the contact members 13 is held in place by screws 14 and springs 15 which tend to hold the members 13 in contact with the trolley wire, even though the side portions 12 of the shoe temporarily break contact with the trolley conductor. If, during operation, the main body of the shoe is caused to leave the wire, the contact members 13 will be forced outwardly by the springs 15 into engagement with the trolley conductor 3.

Although I have described my invention in a simple and preferred form, I desire that it shall not be so limited and that only such restrictions shall be imposed as are indicated in the appended claims.

I claim as my invention:

1. A trolley shoe comprising an elastic member, a plurality of separate contact members mounted in said elastic member, and means for electrically connecting said contact members.

2. A trolley shoe comprising a flexible conducting member, a plurality of current-collecting studs mounted in said flexible conducting member, and means for rendering individual portions of the contact surface of said shoe locally flexible.

3. A trolley shoe comprising a flexible conducting member, a plurality of current-collecting studs mounted in said flexible conducting member, and pneumatic means for rendering individual portions of the contact surface of said shoe locally flexible.

4. The combination with a pantograph frame, of a current-collecting shoe comprising a conducting current-collecting surface, and fluid-inflated means for rendering individual portions of said surface resilient.

5. The combination with a pantograph frame, of a current-collecting shoe comprising a base, a flexible casing mounted on said base, a plurality of current-collecting studs embedded in said casing, and fluid-inflated means for rendering individual portions of said casing locally flexible.

6. A current-collecting shoe comprising a flexible casing, a conducting member embedded within said casing, a plurality of contact members partially embedded in said casing and electrically connected to said conducting member, and means for rendering individual portions of said flexible casing resilient.

In testimony whereof, I have hereunto subscribed my name this 8th day of March, 1917.

OLIVER P. HIPPLE.